United States Patent [19]

Spearman

[11] Patent Number: 5,044,577
[45] Date of Patent: Sep. 3, 1991

[54] AUTOMOBILE ACCESSORY HOLDING DEVICE

[76] Inventor: John W. Spearman, P.O. Box 1051, Easley, S.C. 29641

[21] Appl. No.: 503,667

[22] Filed: Apr. 3, 1990

[51] Int. Cl.⁵ .................. B60R 7/00; B60R 9/00
[52] U.S. Cl. .................. 224/42.45 R; 224/42.44; 224/273; 248/11.2
[58] Field of Search ............ 224/42.45 R, 278, 42.43, 224/42.46 R, 273, 42.44, 279, 280; 248/311.2

[56] References Cited

U.S. PATENT DOCUMENTS

| | | | |
|---|---|---|---|
| 3,606,112 | 9/1971 | Cheshier | 224/42.44 |
| 4,535,923 | 8/1985 | Manke | 224/42.45 R |
| 4,826,058 | 5/1989 | Nakayama | 224/42.44 |
| 4,927,108 | 5/1990 | Blazic et al. | 248/311.2 |
| 4,953,771 | 9/1990 | Fischer et al. | 224/42.43 |

Primary Examiner—Henry J. Recla
Assistant Examiner—Keith Kuperschmid
Attorney, Agent, or Firm—Cort Flint

[57] ABSTRACT

A holder device (A) for a beverage container and accessories which includes an anchor (B) and holder body (C). Anchor (B) includes a wedge-like element (22) adjustably connected at (D) to holder body (C). Element (22) is adpated for insertion into ashtray socket (12) for anchoring holder body (C) so that a beverage container 10 is horizontally held by device (A) within container receptacles (16).

15 Claims, 2 Drawing Sheets

AUTOMOBILE ACCESSORY HOLDING DEVICE

BACKGROUND OF THE INVENTION

The invention relates to a device for holding a beverage container and the like which may be secured at a convenient location within an interior of the automobile.

Prior beverage and accessory holding devices have been provided. U.S. Pat. No. 4,724,986 discloses a beverage receptacle holder for use in vehicles having a mount which includes a part which fits within the vehicle's cigarette lighter socket and a stabilizing part which contacts the vehicle dash board. The construction requires complicated adjustment rendering the holder expensive to manufacture and relatively complicated to use. U.S. Pat. No. 4,535,923 discloses a beverage holding device having a clip which may be fastened to an ashtray or other surface in the passenger compartment. The design is suitable mainly for only a single beverage container. U.S. Pat. No. 4,792,174 discloses a snack tray for an automobile which is slidably mounted within a slot formed in a dashboard of a vehicle. This construction does not readily permit adapting the device to mounting in the vehicle. A slot has to be cut in the dashboard either during manufacture of the vehicle or afterwards. U.S. Pat. No. 4,852,843 discloses a beverage holder which attaches to a vehicle heating and cooling vent. This allows the beverage to be cooled in the summer and warmed in the winter. However, the location of the heating and cooling vents is not always convenient or practical for attachment of such a beverage holder.

Accordingly, an object of the present invention is to provide a device for holding a beverage container and the like accessory within the interior of an automobile passenger compartment in a simple and convenient manner.

Another object of the invention is to provide a holder device for a beverage container and the like accessory within an interior of an automobile which can be easily mounted at a convenient location and easily reachable by a driver and passenger for use.

Another object of the invention is to provide a holder device for a beverage container and the like accessory within an interior of an automobile which can hold a plurality of beverage containers and may be readily adapted for mounting to a convenient location in the interior which may be easily reached by a driver or passenger.

Another object of the invention is to provide a holder device for a beverage container and the like accessory within an interior of an automobile which may be readily adapted to mounting in an ashtray socket in the interior of the automobile in a convenient and stable manner for holding the containers in a substantially horizontal position.

SUMMARY OF THE INVENTION

The above objectives are accomplished according to the present invention by providing a holder for holding a substantially cylindrical beverage container and accessories in a generally upright position in an automobile having a passenger compartment, an ashtray socket being removably inserted and formed in an associated surface in the passenger compartment. The holder comprises an anchor extending outwardly from the holder body which fits within the ashtray socket. The holder body may be carried by the anchor. The anchor is constructed and arranged to hold the anchor body relative to the ashtray socket so that the support surface of the receptacle is generally horizontal for supporting said container in an upright condition. A receptacle is formed in the holder body having a generally horizontal container support surface for supporting the beverage container in a generally upright position when the anchor is inserted in the ashtray socket preventing the beverage from being spilled. The holder body includes an upper surface in which the receptacle is formed. The support surface may be disposed below said upper surface a sufficient distance to provide a depth for receiving the beverage container in stable retention. The anchor includes an anchor body extending from the holder body at an inclination which anchors the holder body in a generally horizontal configuration with respect to said ashtray socket. The anchor body includes an upper surface having a width substantially equal to a width of the ashtray socket. The anchor body further includes a pair of spaced opposed side walls pending downwardly from said upper surface, a lower surface, and a rear wall integral with the opposing side walls and the upper and lower surfaces. The holder body includes an abutment surface adjacent a junction between the holder body and anchor body which abuts the associated surface of the ashtray socket to assist in maintaining the holder body in a stable position. The upper and lower surfaces of the anchor body are inclined with respect to the holder body and may be adjusted in inclinations to provide a wedge effect for locking said anchor body in the ashtray with the holder body stably positioned with the support surfaces of the receptacle generally horizontal.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
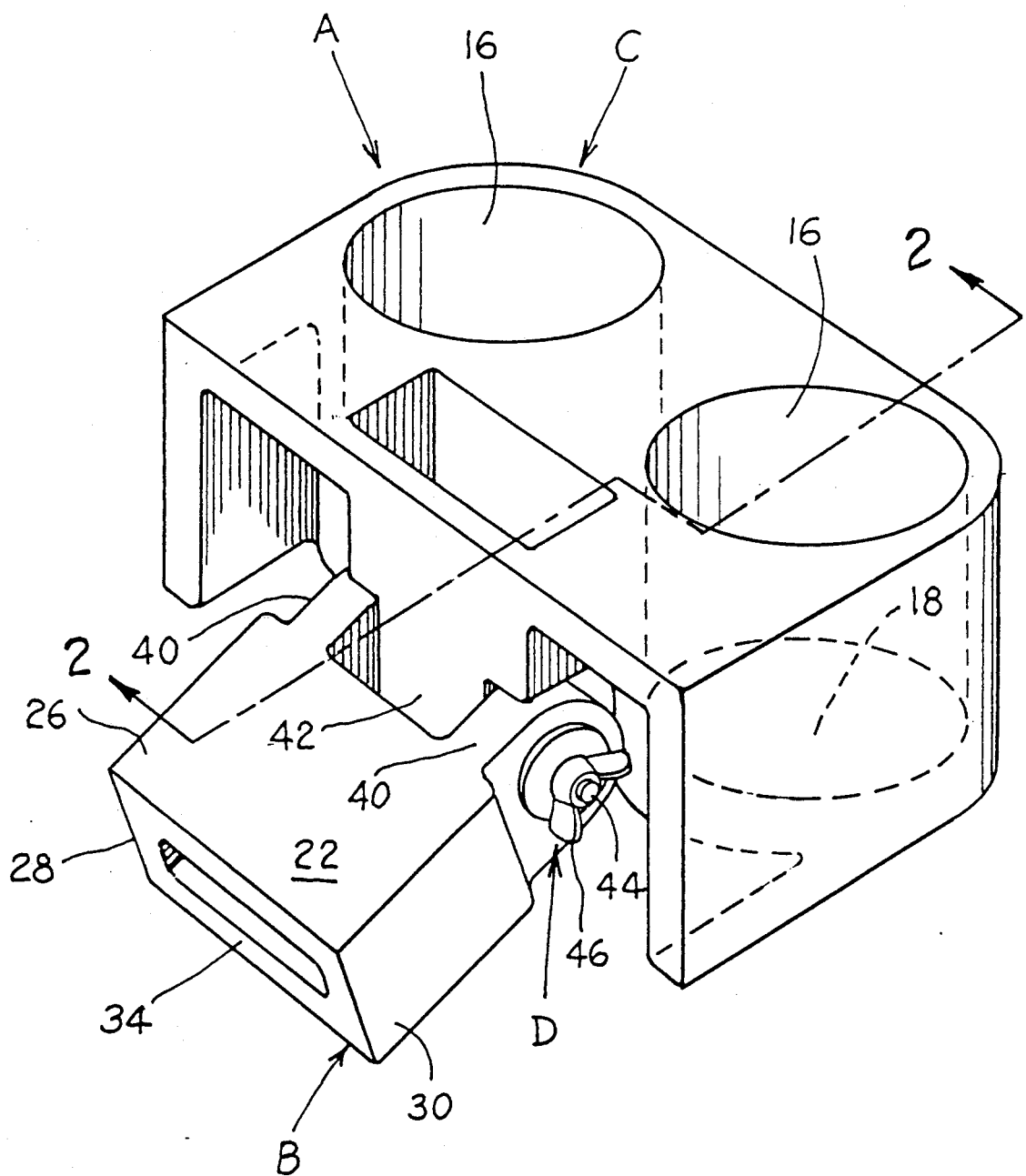
FIG. 1 is a perspective view illustrating a holder device for holding a beverage container and the like accessories in an interior of an automobile as constructed in accordance with the present invention.
Figure 2:
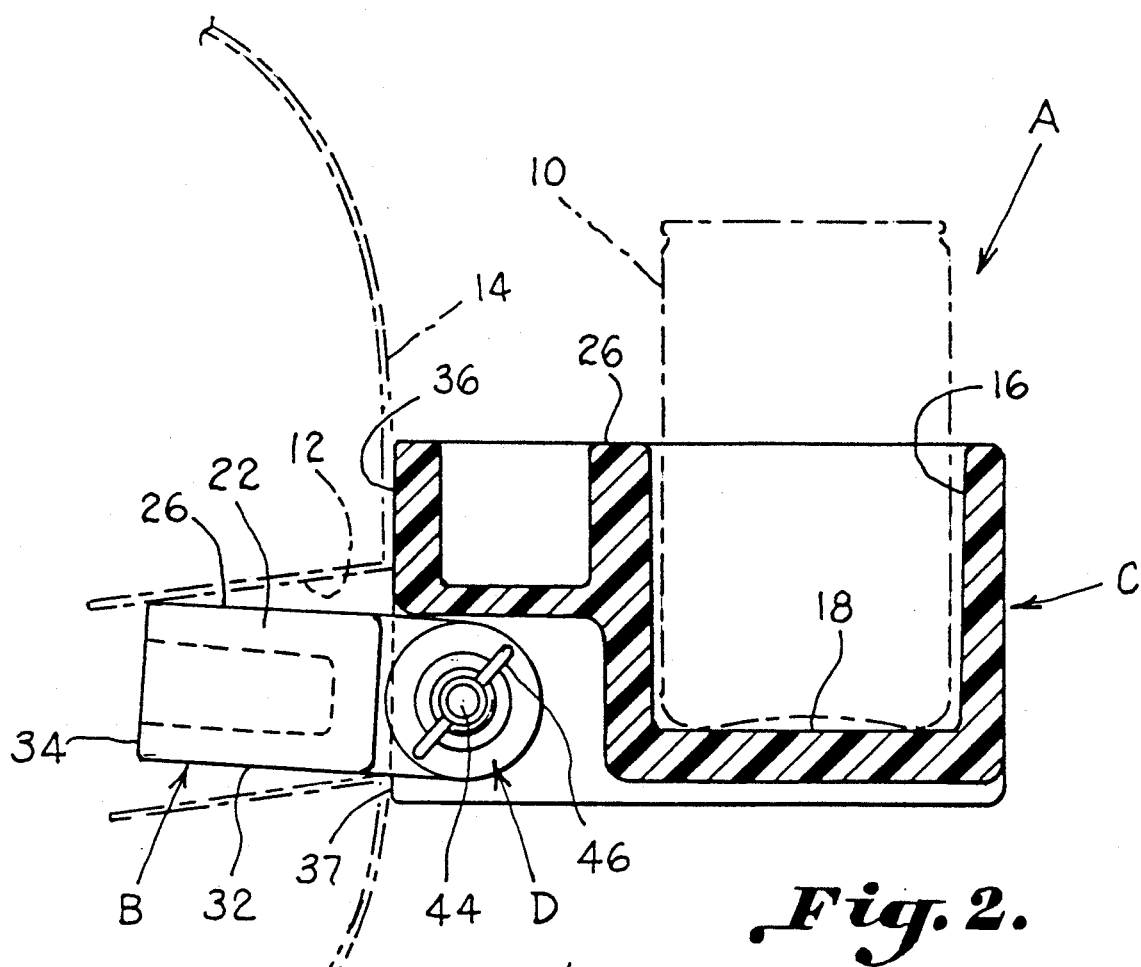
FIG. 2 is a sectional view of a holder device taken along line 2—2 of FIG. 1.

Referring now in more detail to the drawings, as can best be seen in FIGS. 1 and 2, an accessory holding device, designated generally as A, is illustrated for holding a substantially cylindrical beverage container 10 and the like accessories in a generally upright position in an automobile having a passenger compartment. Typically, the passenger compartment of a vehicle comprises an ashtray socket 12 formed in an associated surface 14 in the passenger compartment. Holder A includes an anchor B which fits within ashtray socket 12, and a holder body C is carried by anchor B. A beverage container receptacle 16 is formed in holder body C having a generally horizontal container support surface 18 for supporting beverage container 10 in a generally upright position when anchor b is inserted in ashtray socket 12. This prevents the beverage from being spilled from beverage container 10. Holder body C includes an upper surface 20 in which receptacle 16 is formed. Container support surface 18 may be disposed below upper surface 20 a sufficient distance to provide a depth for receiving beverage container 10 in stable retention.

Anchor B includes an anchor body 22 which extends from holder body C at an inclination which anchors holder body C in a generally horizontal configuration with respect to ashtray socket 12. Anchor body B includes an upper surface 26 having a width substantially equal to a width of ashtray socket 12. Anchor body B further includes a pair of spaced opposed side walls 28, 30 depending downwardly from upper surface 26, a lower surface 32, and a rear wall 34 integral with opposing side walls 28, 30 and upper and lower surfaces 26, 32. Holder body C includes an abutment surfaces 36, 37 adjacent a junction between holder body C and anchor B which abuts associated surface 14 above and below ashtray socket 12 to assist in maintaining holder body C in a stable and desired position. Upper and lower surfaces 26, 32 of anchor B are inclined with respect to holder body C to provide a wedge effect for locking anchor B in ashtray socket 12 with holder body C stably positioned with container support surface 18 of receptacle 16 being generally horizontal. In this sense, the socket engaging surfaces of anchor B provide a wedge-like element, and other body shapes may also be used for this same purpose. Anchor B may be made fixed to fit a certain type automobile or be made universal and adjustable to fit a wide variety of automobiles.

As can best be seen in FIG. 1, connecting means D includes a pair or arms 40 carried by anchor B and a block 42 carried by holder body C through which a bolt 44 passes. A wing nut 46 threaded onto a free end of bolt 44 sets the inclinations of anchor B relative to holder body C once determined to fix receptacle 16 horizontal. Abutment surfaces 36, 37 abut adjacent surfaces above and below socket 12 to assist in fixing and stabilizing the holder in place. Anchor B may be made from a rubber block, or other resilient material to deform and anchor in socket 12. For this purpose, the anchor may be rigid and covered with a rubber, or like friction material, for gripping the inside of socket 12. Holder body C may be any suitable material such as plastic. Anchor B may depend vertically, or may be attached in other orientations, relative to holder body C so that the invention may be applied to ashtray sockets in horizontal surfaces, i.e. center consoles.

Figure 3:
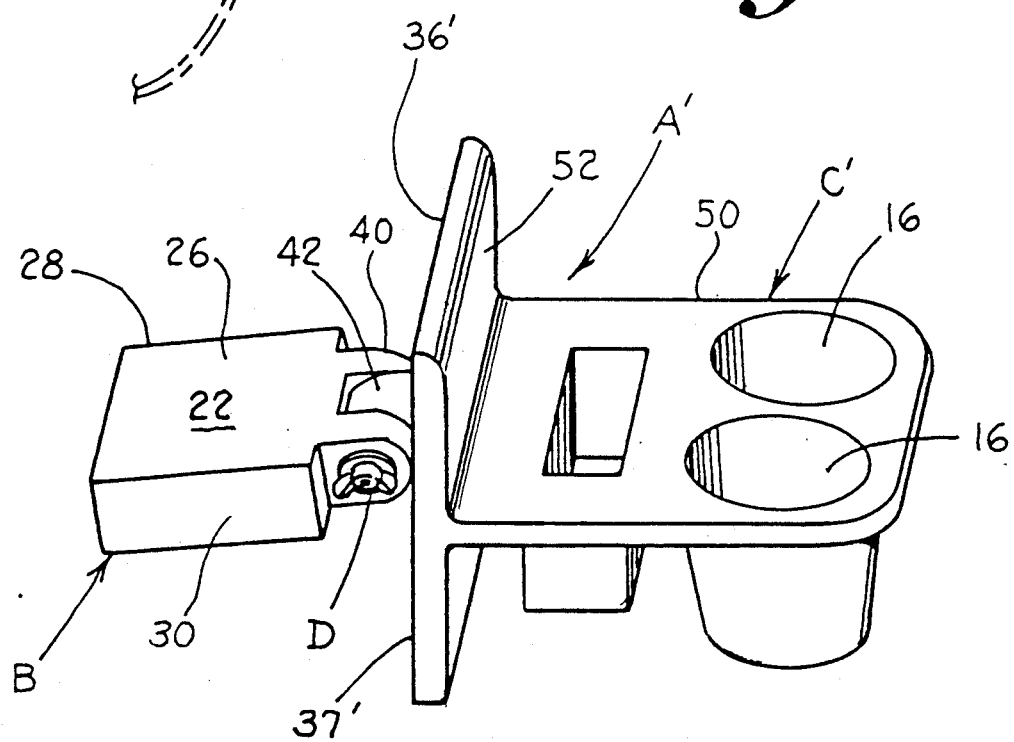
FIG. 3 is a perspective view of an alternate embodiment of a holder device for a beverage container and the like accessories which is adapted for mounting within the ashtray socket in the passenger compartment of an automobile.

FIG. 3 shows an alternate embodiment of a device A' where a holder body C' includes a shelf 50 cantilevered from a back plate 52. Shelf 50 includes container receptacles 16 and back plate 52 is likewise anchored by anchor B and adjusted by connecting means D, and has abutment surfaces 36', 37'.

Thus, it can be seen that a highly advantageous beverage and accessory holder and combination can be had according to the invention. An automobile is disclosed with the combination of having an ashtray socket with ashtray removed for receiving beverage holder A which comprises a holder body and a receptacle for receiving and stably carrying a container for a beverage in a convenient position to the driver.

While a preferred embodiment of the invention has been described using specific terms, such description is for illustrative purposes only, and it is to be understood that changes and variations may be made without departing from the spirit or scope of the following claims.

What is claimed is:

1. A holder for holding a substantially cylindrical beverage container and accessories in a generally upright position in an automobile having a passenger compartment, an ashtray socket having a front opening, and said ashtray socket defined by interior surfaces formed in an associated surface in said passenger compartment and an ashtray disposed within said ashtray socket, said holder comprising:
   (a) an anchor means having first and second end portions, said first end portion adapted to fit within said ashtray socket with said ashtray removed so that said anchor means occupies for a substantial portion of said ashtray socket for engaging said interior surfaces for holding said anchor means in place within said socket;
   (b) a holder body having first and second portions, said first portion of said holder body carried by said second end portion of said anchor means with said holder body extending transversely across said front opening of said ashtray socket, with said holder body contacting said associated surfaces;
   (c) a receptacle formed in said first portion of said holder body and having a generally horizontal container support surface for supporting said beverage container in a generally upright position when said anchor means is inserted in said ashtray socket preventing said beverage from being spilled from said beverage container;
   (d) said holder body including an upper surface in which said receptacle is formed, said container support surface being disposed below said upper surface a sufficient distance to provide a depth for receiving said beverage container in stable retention; and
   (e) said second portion of said holder body being pivotally connected to said second end portion of said anchor means to adjust the angle of the anchor means with respect to the holder body.

2. The device of claim 1 wherein said anchor means includes an anchor body extending from said holder body at an inclination which anchors said holder body in a generally horizontal configuration with respect to said ashtray socket.

3. The device of claim 2 including connector means connecting said anchor body and holder body for adjusting said inclination of said anchor body relative to said holder body.

4. The device of claim 3 wherein said holder body includes an abutment surface adjacent a junction between said holder body and anchor body which is adapted to abut said associated surface of said ashtray socket to assist in maintaining said holder body in a stable position.

5. The device of claim 2 wherein said anchor body includes an upper surface having a width substantially equal to a width of said ashtray socket, a pair of spaced opposed side walls pending downwardly from said upper surface, a lower surface, and a rear wall integral with said opposing side walls and said upper and lower surfaces.

6. The device of claim 5 wherein said upper and lower surfaces of said anchor body are inclined with respect to said holder body to provide a wedge effect for locking said anchor body in said ashtray with said holder body stably positioned with said support surfaces of said receptacle generally horizontal.

7. The device of claim 2 wherein said holder body includes an abutment surface adjacent a junction between said holder body and anchor body which is adapted to abut said associated surface of said ashtray socket to assist in maintaining said holder body in a stable position.

8. In combination with an automobile having a passenger compartment with an ashtray removably inserted in an ashtray socket having a front opening, a beverage holder comprising:

(a) an anchor adapted to fit within said ashtray socket and occupying a substantial portion of said ashtray socket with said ashtray removed;

(b) a holder body carried by said anchor extending generally across said front opening of said ashtray socket, said holder body having first and second portions;

(c) a receptacle formed in said first portion of said holder body and having a generally horizontal container support surface for supporting said beverage container in a generally upright position when said anchor is inserted in said ashtray socket preventing said beverage from being spilled from said beverage container;

(d) said holder body including an upper surface in which said receptacle is formed, said container support surface being disposed below said upper surface a sufficient distance to provide a depth for receiving said beverage container in stable retention;

(e) said anchor including a single piece anchor body having first and second end portions, said second end portion of said anchor body extending from said second portion of said holder body at an inclination which anchors said holder body in a generally horizontal configuration with respect to said ashtray socket; and (f) said anchor body including a wedge-like element having socket engaging surfaces inclined with respect to said holder body to provide a wedge effect for locking said anchor body in said ashtray socket with said ashtray removed so that said holder body is stably positioned with said container support surface of said receptacle generally horizontal.

9. The device of claim 8 including connector means connecting said anchor body and holder body for adjusting said inclination of said anchor body relative to said holder body.

10. The device of claim 8 wherein said wedge-like element includes an upper surface having a width substantially equal to a width of said ashtray socket, a pair of spaced opposed side walls pending downwardly from said upper surface, a lower surface, and a rear wall integral with said opposing side walls and said upper and lower surfaces.

11. A combination of an automobile having a passenger compartment with an ashtray socket for receiving an ashtray, a beverage holder comprising a holder body having first and second portions, said holder first portion having a receptacle for receiving a beverage container, said receptacle having a generally horizontal container support surface for supporting said container in a generally upright position; an anchor comprising a single-piece member having first and second end portions, said first end portion extending outwardly from said holder body inserted in said ashtray socket, said anchor being constructed and arranged to occupy a substantial portion of said ashtray socket with said ashtray removed so as to hold said anchor body within said ashtray socket so that said support surface of said receptacle is generally horizontal for supporting said container in said upright condition, and connecting means which connects the second portion of said holder body to the second end portion of said anchor for adjusting the inclination of said anchor relative to said holder body to position said container support surface generally horizontal.

12. The device of claim 11 wherein said anchor includes an anchor body extending from said holder body at said inclination which anchors said holder body in a generally horizontal configuration with respect to said ashtray socket.

13. The device of claim 12 wherein said anchor body includes an upper surface having a width substantially equal to a width of said ashtray socket, a pair of spaced opposed side walls pending downwardly from said upper surface, a lower surface, and a rear wall integral with said opposing side walls and said upper and lower surfaces.

14. The device of claim 13 wherein said upper and lower surfaces of said anchor body are inclined with respect to said holder body to provide a wedge effect for locking said anchor body in said ashtray with said holder body stably positioned with said support surfaces of said receptacle generally horizontal.

15. The device of claim 12 wherein said holder body includes an abutment surface adjacent a junction between said holder body and anchor body which abuts said associated surface of said ashtray socket to assist in maintaining said holder body in a stable position.

* * * * *